(12) United States Patent
Takebayashi et al.

(10) Patent No.: US 8,834,621 B2
(45) Date of Patent: Sep. 16, 2014

(54) PIGMENT PARTICLE, INK, INK CARTRIDGE, AND INK JET RECORDING METHOD

(75) Inventors: Satoshi Takebayashi, Tokyo (JP); Yoshio Nakajima, Yokohama (JP); Shuichi Okazaki, Fujisawa (JP); Eiichi Nakata, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 82 days.

(21) Appl. No.: 13/588,386

(22) Filed: Aug. 17, 2012

(65) Prior Publication Data

US 2013/0063518 A1 Mar. 14, 2013

(30) Foreign Application Priority Data

Sep. 8, 2011 (JP) ................... 2011-195799

(51) Int. Cl.
| | |
|---|---|
| C09D 11/02 | (2014.01) |
| C09B 29/36 | (2006.01) |
| C09B 67/10 | (2006.01) |
| C09B 67/00 | (2006.01) |
| C09D 11/322 | (2014.01) |
| C09B 67/46 | (2006.01) |
| C09B 29/33 | (2006.01) |

(52) U.S. Cl.
CPC ......... *C09B 67/0015* (2013.01); *C09B 67/0022* (2013.01); *C09D 11/322* (2013.01); *C09B 67/009* (2013.01); *C09B 29/338* (2013.01)
USPC ...................... 106/31.77; 106/31.86; 106/496

(58) Field of Classification Search
CPC C09D 11/322; C09B 29/338; C09B 67/0015; C09B 67/0022; C09B 67/0029
USPC ............ 106/31.77, 31.86, 496; 534/742, 751; 347/86, 100
See application file for complete search history.

(56) References Cited

U.S. PATENT DOCUMENTS

| | | | |
|---|---|---|---|
| 4,312,807 A * | 1/1982 | Fuchs ........................... 534/740 |
| 5,910,577 A | 6/1999 | Metz et al. | |
| 6,074,052 A | 6/2000 | Inui et al. | |
| 6,562,121 B2 | 5/2003 | Nickel et al. | |
| 6,835,242 B2 | 12/2004 | Nickel et al. | |
| 6,936,097 B2 | 8/2005 | Shakhnovich | |
| 7,291,211 B2 | 11/2007 | Kaneko et al. | |
| 7,291,214 B2 | 11/2007 | Tsuji et al. | |
| 7,297,202 B2 | 11/2007 | Ichinose et al. | |
| 7,309,389 B2 * | 12/2007 | Baur et al. ................. 106/31.77 |
| 7,578,876 B2 | 8/2009 | Nakajima et al. | |
| 7,591,889 B2 | 9/2009 | Stoffel et al. | |
| 7,615,113 B2 | 11/2009 | Aikawa et al. | |
| 7,670,418 B2 * | 3/2010 | Kato et al. .................. 106/31.6 |
| 7,705,071 B2 | 4/2010 | Nakagawa et al. | |
| 7,855,041 B2 * | 12/2010 | Weber et al. ............... 106/31.77 |
| 7,999,086 B2 * | 8/2011 | Paetzold et al. ............ 534/742 |
| 8,114,208 B2 | 2/2012 | Nakata et al. | |
| 8,273,168 B2 | 9/2012 | Kakikawa et al. | |
| 2002/0014179 A1 | 2/2002 | Nickel et al. | |
| 2009/0087769 A1 | 4/2009 | Weber et al. | |
| 2009/0258145 A1 | 10/2009 | Mukae et al. | |
| 2010/0136342 A1 | 6/2010 | Tachi et al. | |
| 2010/0326321 A1 | 12/2010 | Enomura | |
| 2011/0001775 A1 | 1/2011 | Nishiwaki et al. | |
| 2011/0177337 A1 | 7/2011 | Enomura | |
| 2012/0050386 A1 | 3/2012 | Shimizu et al. | |
| 2012/0050387 A1 | 3/2012 | Nakata et al. | |

FOREIGN PATENT DOCUMENTS

| | | |
|---|---|---|
| CN | 1330116 A | 1/2002 |
| CN | 1100830 C | 2/2003 |
| CN | 101175823 A | 5/2008 |
| CN | 101270246 A | 9/2008 |
| CN | 101796143 A | 8/2010 |
| CN | 101838485 A | 9/2010 |
| CN | 102165020 A | 8/2011 |

(Continued)

OTHER PUBLICATIONS

Oct. 8, 2013 Chinese Official Action in Chinese Patent Appln. No. 201210328411.4.
Bernhard Stengel-Rutkowski, et al, "Gelb und wetterecht: Ein neues Monoazopigment," Buntpigmente, vol. 106, pp. 38 and 40-42 (Dec. 2000).
Jan. 2, 2014 European Search Report in Counterpart Appln. No. 12006137.9.
Chinese Office Action dated May 19, 2014, issued in counterpart Chinese Application No. 201210328411.4, and English-language translation thereof.

*Primary Examiner* — Helene Klemanski
(74) *Attorney, Agent, or Firm* — Fitzpatrick, Cella, Harper & Scinto

(57) ABSTRACT

Provided is a pigment particle suitable for an ink capable of recording an image that is excellent in color developability and lightfastness, and has a yellow hue. The pigment particle is a pigment particle having a structure represented by the following formula (1), in which a maximum absorption wavelength of an absorption spectrum in a wavelength region of 200 nm or more and 800 nm or less is present in a range of 340 nm or more and 360 nm or less.

11 Claims, No Drawings

(56) References Cited

FOREIGN PATENT DOCUMENTS

| | | |
|---|---|---|
| DE | 102005021159 A1 | 11/2006 |
| EP | 0894831 A1 | 2/1999 |
| EP | 1167461 A2 | 1/2002 |
| EP | 1645604 A2 | 4/2006 |
| JP | 2006-341232 A | 12/2006 |
| JP | 2008-266568 A | 11/2008 |
| WO | 2004/094534 A1 | 11/2004 |
| WO | 2009/008338 A1 | 1/2009 |
| WO | 2009/008388 A1 | 1/2009 |
| WO | 2010/035861 A1 | 4/2010 |

* cited by examiner

PIGMENT PARTICLE, INK, INK CARTRIDGE, AND INK JET RECORDING METHOD

BACKGROUND OF THE INVENTION

1. Field of the Invention

The present invention relates to a pigment particle having a yellow hue, and an ink, an ink cartridge, and an ink jet recording method each using the pigment particle.

2. Description of the Related Art

In recent years, there has been a growing demand for an improvement in lightfastness of an image recorded by an ink jet recording method. To cope with such demand, an investigation has been vigorously conducted on an ink using a pigment as a coloring material. However, an image recorded with the ink using the pigment as a coloring material has lower color developability than that of an image recorded with an ink using a dye as a coloring material. Particularly in the case of an image recorded with a yellow ink, it has been a subject to achieve both its lightfastness and color developability.

In addition, an ideal color tone of a yellow coloring material is such that its hue angle in a CIE L*a*b* colorimetric system is 90°. In actuality, however, a deviation of the color tone toward greenish yellow (whose hue angle is larger than 90°), reddish yellow (whose hue angle is smaller than 90°), or the like occurs owing to, for example, a light absorption characteristic of a pigment. In the case of a yellow coloring material to be used in ink jet recording, the greenish yellow is apt to be recognized as a dull color by the human eye and hence provides such an impression that image vividness is low. Accordingly, the reddish yellow is more suitable than the greenish yellow from the viewpoint of color developability.

Further, in the ink jet recording, plain paper or a recording medium having a coating layer (e.g., glossy paper or art paper) has also become used as a recording medium. Accordingly, it has been such a demanded that an ink to be used in the ink jet recording be capable of realizing high color developability in any one of those various recording media. A method involving using one or more kinds of pigments among C.I. Pigment Yellows 213, 185, and 155 as coloring materials has been proposed for achieving both lightfastness and color developability (see Japanese Patent Application Laid-Open No. 2008-266568).

In addition, there has been a proposal concerning a method involving performing a treatment with a microreactor to produce fine particles of a pigment (International Application No. WO2009/008338). International Application No. WO2009/008338 discloses that such treatment with the microreactor can change the crystal form of the pigment, and describes that α- and γ-type quinacridone pigments were produced. Meanwhile, International Application No. WO2010/035861 disclose that when a copper phthalocyanine pigment is subjected to the similar treatment as disclosed in International Application No. WO2009/008338, its absorption characteristics in a visible light region become different from conventional ones, though its crystal form does not change.

SUMMARY OF THE INVENTION

However, an investigation conducted by the inventors of the present invention has found that when the ink described in Japanese Patent Application Laid-Open No. 2008-266568 is used, the lightfastness of an image to be recorded is secured but its color developability is insufficient. In addition, C.I. Pigment Yellow 183, 191, or the like has been known as a pigment having a reddish yellow hue. However, an investigation conducted by the inventors of the present invention has found that an image recorded with an ink containing such pigment has low chroma and cannot obtain color developability. In addition, International Application No. WO2009/008338 and International Application No. WO2010/035861 each disclose that treating a pigment by a particular method can change its crystal form and absorption characteristics. However, an investigation has been conducted mainly on a quinacridone pigment or a copper phthalocyanine pigment, and what kind of pigment can show changes in its crystal form and absorption characteristics, and the directions of the changes in the absorption characteristics are unclear.

Therefore, an object of the present invention is to provide a pigment particle suitable for an ink capable of recording an image that is excellent in color developability and lightfastness, and has a yellow hue, and an ink suitable for ink jet recording, an ink cartridge, and an ink jet recording method each using the pigment particle.

The object is achieved by the present invention described below. That is, according to the present invention, provided is a pigment particle, having a structure represented by the following formula (1), in which a maximum absorption wavelength of an absorption spectrum in a wavelength region of 200 nm or more and 800 nm or less is present in a range of 340 nm or more and 360 nm or less.

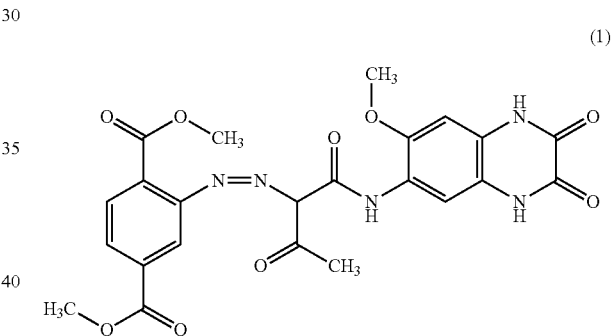

(1)

According to the present invention, provided is a pigment particle suitable for an ink capable of recording an image that is excellent in color developability and lightfastness, and has a yellow hue, and an ink suitable for ink jet recording, an ink cartridge, and an ink jet recording method each using the pigment particle.

DESCRIPTION OF THE EMBODIMENTS

Hereinafter, the present invention is described in detail by way of a preferred embodiment. It should be noted that the abbreviation "C.I." as used in the description of the specification means "color index." In addition, the term "maximum absorption wavelength ($\lambda_{max}$)" refers to the wavelength of a peak present at the longest wavelength among the peaks of an absorption spectrum in 200 nm or more and 800 nm or less (visible region).

An investigation conducted by the inventors of the present invention has found that the effect is obtained by a pigment particle that has a structure represented by the following formula (1) and whose $\lambda_{max}$ is present in the range of 340 nm ≤ $\lambda_{max}$ ≤ 360 nm.

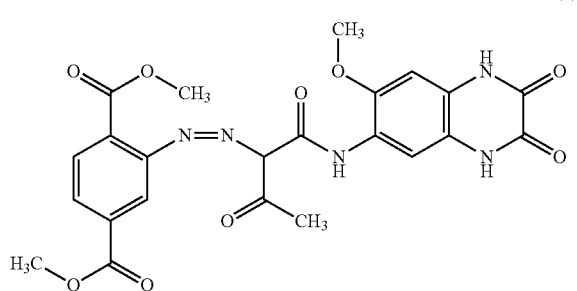

(1)

A compound (pigment) having the structure represented by the formula (1) has been known as C.I. Pigment Yellow 213. The $\lambda_{max}$ of the pigment particles of conventional, general C.I. Pigment Yellow 213 is present in the range of 370 to 390 nm. In addition, it has been known that C.I. Pigment Yellow 213 is somewhat inferior in color developability to other yellow pigments, though its lightfastness is higher than that of other pigments. In addition, the color tone of C.I. Pigment Yellow 213 is somewhat greenish yellow.

An investigation conducted by the inventors of the present invention has found that the following effect is obtained by causing the $\lambda_{max}$ in the visible region of the pigment particles to be present in the range of 340 to 360 nm which is shorter-wavelength region in comparison with that of the conventional C.I. Pigment Yellow 213, while maintaining the molecular structure of C.I. Pigment Yellow 213. That is, a pigment particle having a color tone whose deviation toward green is suppressed, and capable of recording such an image that color developability is improved while lightfastness is maintained is obtained. When the $\lambda_{max}$ is present at a wavelength longer than 360 nm, the color tone is deviated toward a green region. When the $\lambda_{max}$ is present at a wavelength shorter than 340 nm, the color tone is deviated toward an orange region. In other words, once the $\lambda_{max}$ deviates from the range, an image to be recorded no longer has a preferred yellow tone in any case. A possible reason why the color tone is turned into reddish yellow by causing the $\lambda_{max}$ in the visible region to be present in the range of 340 to 360 nm is that the shift of the $\lambda_{max}$ to shorter wavelengths can suppress the absorption of light in a long-wavelength region (yellow to red region).

Pigment Particle

The pigment particle of the present invention can be obtained by common methods of preparing pigment particles that have been conventionally employed. The methods of preparing pigment particles can be roughly classified into two methods, i.e., a breakdown method and a build-up method. The breakdown method is a method involving mechanically grinding a mixture of a bulk raw material or a raw material compound, a dispersant, and a solvent with a dispersing apparatus such as a bead mill to obtain pigment particles. In addition, the build-up method is a method of obtaining pigment particles from a raw material compound dissolved in a solvent through a step such as a chemical reaction or precipitation process, etc. In order that the pigment particle of the present invention can be obtained, the compound (pigment) having the structure represented by the formula (1) is used as the raw material.

A media-type disperser, an ultrasonic disperser, and a high-pressure collision type disperser can be given as examples of the dispersing apparatus to be used for general purposes in the breakdown method. It is also preferred to perform a pre-treatment for the mixture with a rotation shearing-type stirrer or the like in advance to prevent clogging in a nozzle or path of the dispersing apparatus before the use of the dispersing apparatus.

The media-type disperser can be, for example, such that its stirring shaft is provided with a disk, a pin, or a ring, or such that its rotor rotates. It should be noted that the disk to be provided for the stirring shaft may be a perforated disk, or may be a disk having formed therein a notch or a groove. Conventionally known apparatus such as a sand mill, a dyno-mill, and a bead mill can be given as specific examples of such media-type disperser.

As the ultrasonic disperser, there can be used a conventionally known one such as "US-300T" or "US-1200TCVP" (both of which are manufactured by NIPPON SEIKI CO., LTD.) or "Digital Sonifier 250D" (manufactured by BRANSON Co.), all of which are trade names.

For example, a disperser provided with a chamber for pressurizing the mixture with a high-pressure plunger pump to discharge the mixture from a small-diameter nozzle can be used as the high-pressure collision type disperser. A media-less disperser such as a homogenizer or the like is suitable as the high-pressure collision type disperser. The pressurizing pressure upon use of the high-pressure collision type disperser is preferably set to 100 MPa or more. In addition, the number of times of a treatment with the high-pressure collision type disperser is preferably set to twice or more.

The rotation shearing-type stirrer to be used in the pretreatment is only required to be a stirrer capable of applying a shear force to the raw material in the mixture, and a conventionally known batch-type stirrer or the like can be used. The term "shear force" as used herein includes a mechanical energy capable of dispersing powder or fine particles such as an impact force or cavitation as well as a shear stress. The shear force to be applied to the raw material is preferably as high as possible. Specifically, the shear rate is set to preferably $10^4$/sec or more, more preferably $10^5$/sec or more. Such high shear force can be applied by using the following stirrer. The stirrer is provided with a rotor blade and a fixed portion, the gap between the rotor blade and the fixed portion is set to be small, and the stirrer can rotate at a high speed. Specific examples of such stirrer can include "ULTRA-TURRAX" (manufactured by IKA), "T.K. Homomixer" and "T.K. Filmix" (both of which are manufactured by PRIMIX Corporation), and "CLEARMIX" (manufactured by M Technique Co., Ltd.), all of which are trade names.

On the other hand, a dispersing apparatus generally used in the build-up method can be, for example, a microchannel-type liquid processing apparatus (microreactor) used in microchemical process or the like. Specific examples of the microreactor can include "Micromixer" and "Microreactor" (both of which are manufactured by IMM), "Microreactor" (manufactured by CPC Technologies), and "ULREA SS-11" (manufactured by M Technique Co., Ltd.), all of which are trade names.

When the pigment particle of the present invention whose $\lambda_{max}$ is present in the range of 340 nm or more and 360 nm or less is prepared, it may be preferred to cause a certain change in the crystal structure of the pigment serving as a raw material. Here, the crystal structure of the pigment can be changed by the breakdown method. However, when pigment particles are prepared by the breakdown method, the surface of each pigment particle produced by the grinding is apt to have activity. As a result, pigment particles are apt to aggregate with the active surface as a core and hence a coarse particle is apt to be formed. Accordingly, a change over time such as the thickening of a liquid (pigment dispersion or ink) containing the pigment particles is apt to occur and hence the dispersion stability of the particles becomes somewhat insufficient in some cases. Accordingly, it is more preferred to employ the build-up method rather than the breakdown method upon preparation of the pigment particle of the present invention.

When the pigment particle of the present invention whose $\lambda_{max}$ is present in the range of 340 nm or more and 360 nm or less is prepared by the build-up method, the following procedure is preferred. First, a wet cake containing pigment particles is prepared by precipitating fine particles from a liquid having dissolved therein a raw material (pigment coarse material) with the microreactor or the like. After that, a post-treatment (the dispersion of the pigment particles) is performed in the presence of a resin dispersant or the like. An apparatus to be generally utilized upon preparation of an ink for ink jet recording, such as the media-type disperser, the ultrasonic disperser, the high-pressure collision type disperser, or the rotation shearing-type stirrer, can be used in the post-treatment. During the post-treatment, however, the $\lambda_{max}$ of the pigment particles is preferably prevented from changing owing to the dispersion treatment. Accordingly, conditions during the dispersion such as dispersion time, peripheral speed, and the kind and particle diameter of a medium to be used as required are made milder than dispersion conditions during the preparation of the pigment particle of the present invention by the breakdown method described in the foregoing. It is also preferred to adopt the following procedure. After a pigment dispersion containing the pigment particles at a low concentration has been obtained by treating a mixture containing the raw material (pigment coarse material) and a dispersant with the microreactor, the resultant pigment dispersion is concentrated by a treatment such as ultrafiltration and impurities are removed from the dispersion.

By the way, the inventors of the present invention have confirmed that the lightfastness of an image recorded with a pigment particle whose $\lambda_{max}$ is present in 340 nm or more and 360 nm or less reduces to some degree compared to the C.I. Pigment Yellow 213 having general light absorption characteristics in some cases. A possible cause for some degree of reduction of the lightfastness is, for example, a change in crystallinity of the pigment particle. In addition, an investigation conducted by the inventors of the present invention has found that the use of a pigment particle obtained by the following method can suppress a reduction in lightfastness of an image to be recorded. That is, the pigment particle of the present invention is preferably a particle obtained by supplying a liquid having dissolved therein a pigment serving as a raw material to a flow path, which is formed by placing two surfaces for treatment that rotate relatively to each other at an interval of 1 mm or less so that the surfaces are opposite to each other; and precipitating the pigment as a fine particle in the flow path. A product with a trade name "ULREA SS-11" (manufactured by M Technique Co., Ltd.) can be given as an example of the microreactor capable of embodying such method.

The inventors of the present invention assume the reason why the lightfastness of an image recorded with the pigment particle obtained by the method is improved to be as described below. An apparatus such as the "ULREA SS-11" is the so-called forced thin film-type microreactor, and a velocity gradient occurs in the liquid flowing in the flow path by virtue of relative rotation of the two disks (surfaces for treatment) placed so as to be capable of approaching, and departing from, each other. Accordingly, pigment particles having an extremely high sphericity as compared with that obtained by any other method can be produced. The use of such pigment particles having a high sphericity leads to the fixation of the pigment particles in an additionally dense state in a recording medium. As a result, a reduction in lightfastness of the image to be recorded can probably be effectively suppressed.

The pigment particle of the present invention has an average particle diameter of preferably 10 nm or more and 300 nm or less, more preferably 10 nm or more and 100 nm or less, particularly preferably 10 nm or more and 50 nm or less. It should be noted that the term "average particle diameter" as used herein means an average particle diameter on volume basis ($d_{50}$). When the average particle diameter is less than 10 nm, the interaction between pigment particles strengthens. In particular, when the pigment particle is used in an ink, a high level of storage stability cannot be sufficiently obtained in some cases. In addition, when the average particle diameter is more than 300 nm, the use of the pigment particle in a pigment dispersion or an ink may be apt to cause the sedimentation of the pigment particle. In each example to be described later, the average particle diameter of the pigment particle was measured with a dynamic light scattering-type particle diameter-measuring apparatus (trade name: "UPA-UT151," manufactured by NIKKISO CO., LTD.) under the following measurement conditions: "particle permeability" was set to "permeable" and "particle shape" was set to "nonspherical." Although a sample obtained by diluting the pigment particle with pure water by a proper factor can be used in the measurement of the average particle diameter, a surfactant or resin for aiding the dispersion of the pigment particle, a water-soluble organic solvent, or the like may be added to the sample as required. In ordinary cases, the addition of such component to the sample has substantially no influence on the average particle diameter to be measured. In each example to be described later, the average particle diameter of the pigment particle was measured by using a pigment dispersion in a state where the pigment particle was dispersed with a resin dispersant as a sample.

As described in the foregoing, the maximum absorption wavelength ($\lambda_{max}$) is defined as the wavelength of a peak present at the longest wavelength among the peaks of an absorption spectrum in 200 nm or more and 800 nm or less (visible region). When the absorption spectrum is measured by utilizing an aqueous liquid containing the pigment particle, a peak derived from a component other than the pigment such as a solvent or a resin can be present at around 200 nm. Accordingly, in the present invention, a wavelength that provides a peak present at longer wavelengths of the visible region is defined as the $\lambda_{max}$. In particular, in the present invention, the $\lambda_{max}$ of the pigment particle having the structure represented by the formula (1) as a yellow coloring material is specified. Therefore, in an additionally strict sense, the $\lambda_{max}$ can probably be defined as a wavelength that provides the largest absorption peak in an absorption spectrum in 300 nm or more and 500 nm or less (yellow region).

The maximum absorption wavelength ($\lambda_{max}$) of the absorption spectrum of the pigment particle can be measured according to a general method. In each example to be described later, the $\lambda_{max}$ of the absorption spectrum of a liquid containing the pigment particle of the present invention was measured with a spectrophotometer (trade name: "U-3310," manufactured by Hitachi High-Technologies Corporation). It should be noted that during the measurement, the sampling interval was set to 0.5 nm, and peak detection was performed under the conditions of a threshold of 0.01 and a sensitivity of 1. A liquid obtained by diluting the pigment particle with pure water by such a proper factor that its absorbance at the $\lambda_{max}$ is about 1.0 is preferably used as a sample in the measurement. A surfactant or resin for aiding the dispersion of the pigment particle, a water-soluble organic solvent, or the like may be added to the sample as required. In ordinary cases, the addition of such component to the sample has substantially no influence on the $\lambda_{max}$ to be measured. In each example to be described later, the $\lambda_{max}$ of the pigment particle was measured by using a pigment dispersion in a state where the pigment particle was dispersed with a resin dispersant as a sample. On the other hand, a component such as a coloring material having an absorption wavelength in the visible region needs to be prevented from being incorporated into the measurement sample because the component may affect the $\lambda_{max}$ to be measured for the pigment particle having the structure represented by the formula (1). In other words, when the inclusion of an unnecessary component (e.g., another coloring material) in the sample as a measuring object is expected, the sample from which such component has been removed is prepared and subjected to the measurement.

Ink

An ink of the present invention contains the pigment particle of the present invention. Hereinafter, a component constituting the ink of the present invention and the like are described in detail.

Pigment Particle

The pigment particle of the present invention is incorporated into the ink of the present invention. The content (% by mass) of the pigment particle in the ink is preferably 0.1% by mass or more and 10.0% by mass or less, more preferably 0.1% by mass or more and 5.0% by mass or less based on the total mass of the ink. It should be noted that a pigment different from the pigment particle of the present invention or a dye may be used in combination as a coloring material for the ink in addition to the pigment particle.

The manner in which the pigment particle is dispersed in the ink of the present invention is not limited. A resin-dispersed pigment using a resin as a dispersant, a pigment dispersed with a surfactant, and a microcapsule pigment obtained by covering at least part of the surface of the pigment particle with a resin or the like can be given as an example. Of those, a resin-dispersed pigment obtained by causing a resin as a dispersant to physically adsorb to the surface of a pigment particle and dispersing the pigment particle by means of the action of the resin is preferred. The resin dispersant is preferably capable of dispersing the pigment particle in an aqueous medium by means of the action of an anionic group or a nonionic group. A conventionally known copolymer that can be used in an ink for ink jet recording or a salt thereof can be used as the resin dispersant. A more suitable resin dispersant is, for example, a copolymer having such a hydrophilic unit and a hydrophobic unit as listed below. The hydrophilic unit is, for example, a unit derived from a hydrophilic monomer such as a monomer having a carboxy group such as (meth) acrylic acid or a salt thereof. In addition, the hydrophobic unit is, for example, a unit derived from a hydrophobic monomer such as styrene or a derivative thereof, a monomer having an aromatic ring such as benzyl (meth)acrylate, or a monomer having an aliphatic group such as a (meth)acrylate.

1,2-Alkanediol

An investigation conducted by the inventors of the present invention has found the following new problem. When the ink containing the pigment particle of the present invention is used, the color developability (chroma) of an image recorded by using the art paper as a recording medium reduces to some degree in some cases. The art paper, which is a recording medium having a coating layer, has a coating layer whose pore size is larger than that of the so-called glossy paper. Accordingly, the following tendency arises. The pigment particle is apt to sink into the paper and hence the color developability of the paper is apt to be lower than that of the glossy paper. An investigation conducted by the inventors of the present invention with a view to solving such problem has found that the addition of a 1,2-alkanediol to the ink improves the color developability of even the image recorded in the art paper.

In ordinary cases, the use of the ink containing the 1,2-alkanediol leads to a reduction in color developability of an image recorded by using the art paper as a recording medium because the permeability of the ink into the recording medium is raised and hence the pigment particle is apt to sink into the recording medium. In contrast, in the ink of the present invention, the addition of the 1,2-alkanediol can suppress a reduction in color developability of an image recorded by using the art paper as a recording medium. The inventors of the present invention assume the mechanism via which the reduction in color developability of the image can be suppressed by the addition of the 1,2-alkanediol as described above to be as described below.

A dispersion treatment causes a certain physical or chemical change in the surface of the pigment particle. The color developability of the image probably reduces because the pigment particle whose surface has undergone the certain change is apt to sink into the recording medium. The 1,2-alkanediol is a compound having a hydrophilic portion and a hydrophobic portion in its structure. That is, the 1,2-alkanediol is a compound having a structure like a surfactant but its molecular weight is extremely small as compared with that of a general surfactant. Accordingly, when pigment particles dispersed with a resin dispersant are used, the resin adsorbs to the surface of pigment particles but the 1,2-alkanediol enters a slight gap in the surface to be present in a state of keeping an appropriate adsorption-desorption equilibrium with respect to the surface of the pigment particle. In addition, the action of the 1,2-alkanediol facilitates the aggregation of the pigment particles and hence the sinking of the pigment particles into the recording medium is probably suppressed.

In view of the foregoing, the 1,2-alkanediol is preferably incorporated into the ink of the present invention. The 1,2-alkanediol is preferably such a 1,2-alkanediol as to be a liquid at normal temperature (25° C.) such as 1,2-propanediol, 1,2-butanediol, or 1,2-pentanediol because such 1,2-alkanediol easily dissolves in the aqueous medium constituting the ink and hence the above-mentioned action easily occurs.

When the 1,2-alkanediol is used, the content (% by mass) of the 1,2-alkanediol in the ink is preferably 0.2% by mass or more and 10.0% by mass or less, more preferably 1.0% by mass or more and 5.0% by mass or less based on the total mass of the ink. When the content of the 1,2-alkanediol is less than 0.2% by mass, the following tendency arises. A suppressing action on the sinking of the pigment particles into the recording medium hardly occurs and hence an improving effect on the color developability is hardly obtained. On the other hand, when the content of the 1,2-alkanediol is more than 10.0% by mass, the ejectability of the ink tends to be apt to reduce owing to the facilitation of the aggregation of the pigment particles even in the ink, with the result that sufficient color developability is not obtained in some cases.

Polyoxyethylene Alkyl Ether

A polyoxyethylene alkyl ether is preferably incorporated as a surfactant into the ink of the present invention. The incorporation of the polyoxyethylene alkyl ether can additionally improve the color developability of an image recorded by using, in particular, glossy paper as a recording medium. The polyoxyethylene alkyl ether has a retarding action on the permeation and drying of an ink droplet in the recording medium. Accordingly, the compatibility between an ink dot applied earlier to the recording medium and an ink dot applied later thereto is improved. As a result, a pigment layer to be formed on the recording medium becomes additionally smooth, and hence the glossiness of the image can be improved and its color developability can also be improved. When multi-path recording (a method involving recording an image in a unit region such as one band or one pixel through multiple times of scanning with a recording head) effective in recording a high-definition image is performed, it is particularly effective to use the ink containing the polyoxyethylene alkyl ether. This is because of the following reason. When the multi-path recording is performed, an image hardly becomes smooth because the time interval during which multiple dots are formed enlarges. However, the use of the polyoxyethylene alkyl ether can smoothen the image even when the multi-path recording is performed.

The polyoxyethylene alkyl ether is a compound having a high molecular weight. Accordingly, the rate at which the polyoxyethylene alkyl ether evaporates from a recording medium and the rate at which the polyoxyethylene alkyl ether permeates the recording medium are moderate. In addition, the polyoxyethylene alkyl ether easily becomes compatible with each of a hydrophilic substance and a lipophilic substance because the polyoxyethylene alkyl ether is a compound having a polyoxyethylene chain and a hydrocarbon chain in its structure. As a result, ink dots overlap each other in a liquid state and easily fit to the recording medium. Accordingly, the dot height can be suppressed to a low level, and the glossiness and color developability of an image can be improved. Further, the polyoxyethylene alkyl ether does not inhibit a reaction between a cationic substance in the recording medium and an anionic component (such as the resin dispersant) in the ink, and can efficiently bond both the substance and the component because the polyoxyethylene alkyl ether is a nonionic compound. Accordingly, the pigment particle can be fixed to the surface of the recording medium or the vicinity thereof.

The polyoxyethylene alkyl ether has a structure represented by a general formula "R—O—$(CH_2CH_2O)_m$H." In the general formula, R represents a hydrocarbon group and m represents an integer. The number of carbon atoms of R (alkyl group) in the general formula as the hydrophobic group of the polyoxyethylene alkyl ether to be incorporated into the ink of the present invention is preferably 12 to 22. More specifically, R in the general formula preferably represents a lauryl group (12), a cetyl group (16), a stearyl group (18), an oleyl group (18), a behenyl group (22), or the like (a numerical value in parentheses represents the number of carbon atoms of the hydrocarbon group). In addition, m in the general formula representing the number of ethylene oxide groups as the hydrophilic groups of the polyoxyethylene alkyl ether represents preferably 10 or more and 50 or less, more preferably 10 or more and 40 or less.

The content (% by mass) of the polyoxyethylene alkyl ether in the ink is preferably 0.05% by mass or more and 2.0% by mass or less, more preferably 0.2% by mass or more and 1.0% by mass or less based on the total mass of the ink. When the content of the polyoxyethylene alkyl ether is less than 0.05% by mass, an improving effect on compatibility between multiple dots on the surface of a recording medium tends to be insufficient. Accordingly, the smoothness of a pigment layer to be formed on the surface of the recording medium reduces to some degree and hence the glossiness of an image reduces, which may resultantly lead to a reduction in color developability of an image recorded by using glossy paper as the recording medium. On the other hand, when the content of the polyoxyethylene alkyl ether is more than 2.0% by mass, the following tendency arises. Competitive adsorption of the polyoxyethylene alkyl ether and the resin dispersant to the surface of the pigment particle becomes remarkable, and hence the nonionicity of the surface of the pigment particle strengthens. As a result, a bond between the resin dispersant having an anionic group for dispersing the pigment particle and a cationic substance in the recording medium weakens, and hence the pigment particle is apt to sink into the recording medium particularly in the case where the medium is art paper or plain paper. Accordingly, the color developability reduces to some degree in some cases.

The polyoxyethylene alkyl ether has an HLB value determined by Griffin's method of preferably 13.0 or more, more preferably 15.0 or more. When the HLB value is less than 13.0, an alleviating action on the fixation of a dot reduces and hence an improving effect on color developability is not obtained in some cases. It should be noted that the upper limit for the HLB value is 20.0 as described later. Accordingly, the upper limit for the HLB value of the polyoxyethylene alkyl ether to be suitably used in the present invention is also 20.0 or less.

Here, Griffin's method that specifies the HLB value of a surfactant is described. An HLB value based on Griffin's method is determined from the formula weight of a hydrophilic group of a surfactant and the molecular weight of the surfactant by using the following equation (2). The HLB value, which falls within the range of 0.0 to 20.0, represents the degree of the hydrophilicity or lipophilicity of a surfactant. A lower HLB value means that the lipophilicity (hydrophobicity) of the surfactant is higher. On the other hand, a higher HLB value means that the hydrophilicity of the surfactant is higher.

$$\text{HLB value} = 20 \times (\text{formula weight of hydrophilic group of surfactant}) / (\text{molecular weight of surfactant}) \quad (2)$$

Aqueous Medium

An aqueous medium that is water or a mixed solvent of water and a water-soluble organic solvent can be incorporated into the ink of the present invention. Deionized water is preferably used as water. The water content (% by mass) in the ink is preferably 50.0% by mass or more and 95.0% by mass or less based on the total mass of the ink. The ink of the present invention is preferably an aqueous ink containing at least water as the aqueous medium. In addition, any one of the solvents that can be used in inks for ink jet recording such as alcohols, glycol ethers, and nitrogen-containing compounds can be used as the water-soluble organic solvent, and one or two or more kinds thereof can be incorporated into the ink. The content (% by mass) of the water-soluble organic solvent in the ink is preferably 3.0% by mass or more and 50.0% by mass or less based on the total mass of the ink. It should be noted that the content of the water-soluble organic solvent is a value including the 1,2-alkanediol to be used as required.

Other Components

A water-soluble organic compound that is a solid at normal temperature such as urea or a derivative thereof, trimethylolpropane, or trimethylolethane in addition to the above-described components may be incorporated into the ink of the present invention. The content (% by mass) of the water-soluble organic compound that is a solid at normal temperature in the ink is preferably 0.1% by mass or more and 20.0% by mass or less, more preferably 3.0% by mass or more and 10.0% by mass or less based on the total mass of the ink. In addition, various other additives such as a surfactant, a pH adjustor, a defoaming agent, a rust inhibitor, an antiseptic, a mildewproofing agent, an antioxidant, a reduction inhibitor, an evaporation accelerator, and a chelating agent may be incorporated as required.

Ink Cartridge

An ink cartridge of the present invention is provided with an ink and an ink storage portion for storing the ink. In addition, the ink stored in the ink storage portion is the ink of the present invention described in the foregoing. The structure of the ink cartridge is, for example, such that the ink storage portion is constituted of an ink storage chamber for storing a liquid ink and a negative pressure-generating member storage chamber for storing a negative pressure-generating member for holding the ink in itself with a negative pressure. Alternatively, the ink cartridge may be such that the ink storage portion does not have an ink storage chamber for storing a liquid ink and is constituted so as to hold the total amount to be stored with the negative pressure-generating member. Further, the ink cartridge may be constituted so as to have the ink storage portion and a recording head.

Ink Jet Recording Method

An ink jet recording method of the present invention is a method including ejecting the ink of the present invention described in the foregoing from an ink jet recording head to record an image on a recording medium. A mode of ejecting the ink is, for example, a mode involving applying a mechanical energy to the ink or a mode involving applying a thermal energy to the ink. An ink jet recording method involving utilizing a thermal energy is particularly preferably adopted in the present invention. The process of the ink jet recording method may be known ones except that the ink of the present invention is used. Although any recording medium may be used as the recording medium, paper having permeability such as plain paper and a recording medium having a coating layer (e.g., glossy paper or art paper) is preferably used. Of those, the recording medium having a coating layer capable of causing at least part of the pigment particles in the ink to be present on the surface of the recording medium or the vicinity thereof is particularly preferably used. Such recording medium can be selected according to, for example, the intended use of a recorded product in which the image has been recorded. Examples of the recording medium include: glossy paper suitable for obtaining an image having a photo-quality glossy feeling; and art paper taking advantage of the texture of a base material (e.g., drawing paper texture, canvas texture, or Japanese paper texture) for representing a picture, a photograph, a graphic image, and the like according to one's liking.

The ink of the present invention can be used as an ink set by being combined with another ink. One or two or more kinds can be selected from, for example, cyan, magenta, yellow, black, red, green, and blue inks as the hue of the other ink. Multiple inks identically having the same hue as that of any such ink as described above and different from each other in pigment content may also be used as inks constituting the ink set.

EXAMPLES

Next, the present invention is described more specifically by way of examples and comparative examples. However, the present invention is not limited to the following examples unless going beyond the gist thereof. It should be noted that the terms "part(s)" and "%" each used for describing the usage of a component refer to "part(s) by mass" and "% by mass," respectively unless otherwise stated. In addition, a product with a trade name "HOSTAPERM Yellow H5G" (manufactured by Clariant Co.) was used as C.I. Pigment Yellow 213. In addition, a product with a trade name "PALIOTOLE Yellow K2270" (manufactured by BASF Co.) was used as C.I. Pigment Yellow 183.

Preparation of Wet Cake Containing Pigment Particles

Wet Cake 1

1,500 milliliters of a solution obtained by dissolving acetic acid in methanol (1.0% acetic acid solution) was prepared as a liquid A. In addition, 90 mL of a solution obtained by dissolving 2.0 parts of C.I. Pigment Yellow 213 in a mixed liquid of 78.4 parts of dimethylsulfoxide (reagent grade) and 19.6 parts of 0.5-mol/L potassium hydroxide (ethanol solution) was prepared as a liquid B. A treatment based on the build-up method was performed with a microreactor (trade name: "ULREA SS-11," manufactured by M Technique Co., Ltd.) while the temperature of the liquid A was set to 5° C., the temperature of the liquid B was set to 25° C., the flow rate of the liquid A was set to 50 mL/min, and the flow rate of the liquid B was set to 3 mL/min. After the treatment, the resultant was filtered with a Buchner funnel. Thus, a paste was obtained. The resultant paste was washed with ion-exchanged water three times and then a proper amount of ion-exchanged water was added to the washed product. Thus, a wet cake 1 having a pigment particle (solid matter) content of 15.0% was prepared.

Wet Cake 2

The same liquid A and liquid B as those used upon preparation of the "wet cake 1" were prepared. A treatment based on the build-up method was performed with a microreactor (trade name: "CYTOS Lab System-2000," manufactured by CPC Technologies) while the flow rate of the liquid A was set to 10 mL/min and the flow rate of the liquid B was set to 0.6 mL/min. After the treatment, the resultant was filtered with a Buchner funnel. Thus, a paste was obtained. The resultant paste was washed with ion-exchanged water three times and then a proper amount of ion-exchanged water was added to the washed product. Thus, a wet cake 2 having a pigment particle (solid matter) content of 15.0% was prepared.

Wet Cake 3

The same liquid A and liquid B as those used upon preparation of the "wet cake 1" were prepared. A treatment based on the build-up method was performed with a micromixer (trade name: "HPIMM-Las45250," manufactured by IMM Co.) while the flow rate of the liquid A was set to 10 mL/min and the flow rate of the liquid B was set to 0.6 mL/min. After the treatment, the resultant was filtered with a Buchner funnel. Thus, a paste was obtained. The resultant paste was washed with ion-exchanged water three times and then a proper amount of ion-exchanged water was added to the washed product. Thus, a wet cake 3 having a pigment particle (solid matter) content of 15.0% was prepared.

Wet Cake 4

A liquid B was prepared in the same manner as in the case of the "wet cake 1" except that C.I. Pigment Yellow 183 was used instead of C.I. Pigment Yellow 213. Then, a wet cake 4 having a pigment particle (solid matter) content of 15.0% was prepared in the same manner as in the case of the "wet cake 1" except that the liquid B thus prepared was used.

Each pigment used as a raw material and each wet cake obtained in the foregoing were subjected to NMR analysis. As a result, it was confirmed that $^1H$ and $^{13}C$ spectra after the treatment coincided with those before the treatment. Accordingly, it was confirmed that each pigment particle in each wet cake thus prepared had the same molecular structure as that of the pigment used as a raw material. It should be noted that the NMR analysis was performed by using a solution obtained by dissolving a wet cake containing a powdery pigment used as a raw material or pigment particles in a mixture of DMSO-$d_6$ and 0.5-mol/L potassium hydroxide (ethanol solution) as a sample under the conditions of normal temperature (25° C.) and 400 MHz.

Preparation of Pigment Dispersion

Pigment Dispersion Containing Pigment Particles 1

70.0 Parts of the wet cake 1, 24.0 parts of an aqueous solution of a resin dispersant 1 (having a resin (solid matter) content of 25.0%), and 6.0 parts of water were mixed. It should be noted that the resin dispersant 1 is obtained by neutralizing a styrene-acrylic acid copolymer (trade name: "JONCRYL 680," acid value: 215 mgKOH/g, weight-average molecular weight: 4,900, manufactured by BASF Co.) with potassium hydroxide so that the neutralization equivalent is 0.85. Then, the mixture was subjected to a dispersion treatment with a rotation shearing-type stirrer (trade name: "CLM-2.2S," manufactured by M Technique Co., Ltd.) for 60 minutes at 3,500 rpm. After that, the resultant was centrifuged at a rotational frequency of 5,000 rpm for 30 minutes. Thus, an aggregate component was removed. The remainder was diluted with ion-exchanged water. Thus, a pigment dispersion containing pigment particles 1 having an average particle diameter of 18 nm and a maximum absorption wavelength $\lambda_{max}$ of 351 nm was obtained. The content of the pigment particles 1 in the resultant pigment dispersion was 10.0%.

Pigment Dispersion Containing Pigment Particles 2

The same treatments as in the case of the "pigment particles 1" were carried out except that 70.0 parts of the wet cake 1, 15.0 parts of an aqueous solution of the resin dispersant 2 (having a resin (solid matter) content of 40.0%), and 15.0 parts of water were used. It should be noted that the resin dispersant 2 is obtained by neutralizing a styrene-butyl acrylate-acrylic acid copolymer (acid value: 120 mgKOH/g, weight-average molecular weight: 10,000) with potassium hydroxide so that the neutralization equivalent is 0.85. Thus, a pigment dispersion containing pigment particles 2 having an average particle diameter of 20 nm and a maximum absorption wavelength $\lambda_{max}$ of 352 nm was obtained. The content of the pigment particles 2 in the resultant pigment dispersion was 10.0%.

Pigment Dispersion Containing Pigment Particles 3

60.0 Parts of the wet cake 1, 24.0 parts of an aqueous solution of the resin dispersant 1 (having a resin (solid matter) content of 25.0%), and 16.0 parts of water were mixed. The mixture was subjected to a dispersion treatment with an ultrasonic disperser (trade name: "US-300T," manufactured by NIPPON SEIKI CO., LTD.) at an output of 300 W for 60 minutes. After that, the resultant was centrifuged at a rotational frequency of 5,000 rpm for 30 minutes. Thus, an aggregate component was removed. The remainder was diluted with ion-exchanged water. Thus, a pigment dispersion containing pigment particles 3 having an average particle diameter of 22 nm and a maximum absorption wavelength $\lambda_{max}$ of 350 nm was obtained. The content of the pigment particles 3 in the resultant pigment dispersion was 10.0%.

Pigment Dispersion Containing Pigment Particles 4

A pigment dispersion containing pigment particles having an average particle diameter of 16 nm and a maximum absorption wavelength $\lambda_{max}$ of 341 nm was obtained in the same manner as in the case of the "pigment particles 1" except that the wet cake 2 was used instead of the wet cake 1. The content of the pigment particles 4 in the resultant pigment dispersion was 10.0%.

Pigment Dispersion Containing Pigment Particles 5

10.5 Parts of C.I. Pigment Yellow 213, 24.0 parts of an aqueous solution of the resin dispersant 1 (having a resin (solid matter) content of 25.0%), and 65.5 parts of water were mixed. The resultant mixture was loaded into a bead mill (trade name: "LMZ2," manufactured by Ashizawa Finetech Ltd.) filled with zirconia beads having a diameter of 0.1 mm at a ratio of 80.0%, and was then subjected to a dispersion treatment at a peripheral speed of 12 m/s for 5 hours. After that, the resultant was centrifuged at a rotational frequency of 5,000 rpm for 30 minutes. Thus, an aggregate component was removed. The remainder was diluted with ion-exchanged water. Thus, a pigment dispersion containing pigment particles 5 having an average particle diameter of 48 nm and a maximum absorption wavelength $\lambda_{max}$ of 358 nm was obtained. The content of the pigment particles 5 in the resultant pigment dispersion was 10.0%.

Pigment Dispersion Containing Pigment Particles 6

A pigment dispersion containing pigment particles having an average particle diameter of 18 nm and a maximum absorption wavelength $\lambda_{max}$ of 338 nm was obtained in the same manner as in the case of the "pigment particles 1" except that the wet cake 3 was used instead of the wet cake 1. The content of the pigment particles 6 in the resultant pigment dispersion was 10.0%.

Pigment Dispersion Containing Pigment Particles 7

10.5 Parts of C.I. Pigment Yellow 213, 24.0 parts of an aqueous solution of the resin dispersant 1 (having a resin (solid matter) content of 25.0%), and 65.5 parts of water were mixed. The resultant mixture was subjected to three paths of a dispersion treatment with a high-pressure collision type disperser (trade name: "Nanomizer," manufactured by YOSHIDA KIKAI CO., LTD.) at a pressure of 150 MPa. After that, the resultant was centrifuged at a rotational frequency of 5,000 rpm for 30 minutes. Thus, an aggregate component was removed. The remainder was diluted with ion-exchanged water. Thus, a pigment dispersion containing pigment particles 7 having an average particle diameter of 55 nm and a maximum absorption wavelength $\lambda_{max}$ of 362 nm was obtained. The content of the pigment particles 7 in the resultant pigment dispersion was 10.0%.

Pigment Dispersion Containing Pigment Particles 8

10.5 Parts of C.I. Pigment Yellow 213, 24.0 parts of an aqueous solution of the resin dispersant 1 (having a resin (solid matter) content of 25.0%), and 65.5 parts of water were mixed. The resultant mixture was loaded into a glass container filled with zirconia beads having a diameter of 0.3 mm at a ratio of 50.0%, and was then subjected to a dispersion treatment for 8 hours with a simple disperser (paint shaker, trade name: "DAS200-K," manufactured by Lau Industries). After that, the resultant was centrifuged at a rotational frequency of 5,000 rpm for 30 minutes. Thus, an aggregate component was removed. The remainder was diluted with ion-exchanged water. Thus, a pigment dispersion containing pigment particles 8 having an average particle diameter of 125 nm and a maximum absorption wavelength $\lambda_{max}$ of 382 nm was obtained. The content of the pigment particles 8 in the resultant pigment dispersion was 10.0%.

Pigment Dispersion Containing Pigment Particles 9

10.5 Parts of C.I. Pigment Yellow 213, 34.5 parts of an aqueous solution of the resin dispersant 3 (having a resin (solid matter) content of 38.0%), and 55.0 parts of water were mixed. It should be noted that the resin dispersant 3 is obtained by neutralizing a styrene-acrylic acid copolymer (acid value: 210 mgKOH/g, weight-average molecular weight: 10,000) with ammonia water so that the neutralization equivalent is 0.85. Glass beads having a diameter of 1.7 mm were added to the resultant mixture and then the whole was subjected to a dispersion treatment with a sand mill (manufactured by YASUKAWA SEISAKUSHO CO., LTD.) for 2 hours. After that, the resultant was centrifuged at a rotational frequency of 5,000 rpm for 30 minutes. Thus, an aggregate component was removed. The remainder was diluted with ion-exchanged water. Thus, a pigment dispersion containing pigment particles 9 having an average particle diameter of 95 nm and a maximum absorption wavelength $\lambda_{max}$ of 378 nm was obtained. The content of the pigment particles 9 in the resultant pigment dispersion was 10.0%.

Pigment Dispersion Containing Pigment Particles 10

60.0 Parts of the wet cake 4, 24.0 parts of an aqueous solution of the resin dispersant 1 (having a resin (solid matter) content of 25.0%), and 16.0 parts of water were mixed. The resultant mixture was subjected to a dispersion treatment with an ultrasonic disperser (trade name: "US-300T," manufactured by NIPPON SEIKI CO., LTD.) at an output of 300 W for 1 hour. After that, the resultant was centrifuged at a rotational frequency of 5,000 rpm for 30 minutes. Thus, an aggregate component was removed. The remainder was diluted with ion-exchanged water. Thus, a pigment dispersion containing pigment particles 10 having an average particle diameter of 22 nm and a maximum absorption wavelength $\lambda_{max}$ of 360 nm was obtained. The content of the pigment particles 10 in the resultant pigment dispersion was 10.0%.

Preparation of Inks (Examples 1 to 20 and Comparative Examples 1 to 5)

Respective components (unit: %) shown in Tables 1-1 to 1-3 were mixed with each other and thoroughly stirred. After that, pressure filtration was performed with a membrane filter having a pore size of 1.2 μm (trade name "HDC II Filter," manufactured by Pall Corporation) to prepare each ink. It should be noted that details of trade names in Tables 1-1 to 1-3 are shown below.

"Proxel GXL (S)": antiseptic manufactured by Arch Chemicals Co.

"Proxel XL2": antiseptic manufactured by Arch Chemicals Co.

"NIKKOL BC-20": polyoxyethylene cetyl ether manufactured by Nikko Chemicals Co., Ltd., HLB value: 15.7, mole of added ethylene oxide group: 20

"NIKKOL BO-50": polyoxyethylene oleyl ether manufactured by Nikko Chemicals Co., Ltd., HLB value: 17.8, mole of added ethylene oxide group: 50

"NIKKOL BL-9EX": polyoxyethylene lauryl ether manufactured by Nikko Chemicals Co., Ltd., HLB value: 13.6, mole of added ethylene oxide group: 9

"Acetylenol E100": acetylene glycol-based surfactant manufactured by Kawaken Fine Chemicals Co., Ltd.

"BYK-348": silicone-based nonionic surfactant manufactured by BYK-Chemie

TABLE 1-1

Composition of ink

| | | Example | | | | | | | | | |
|---|---|---|---|---|---|---|---|---|---|---|---|
| | | 1 | 2 | 3 | 4 | 5 | 6 | 7 | 8 | 9 | 10 |
| Kinds of pigment particles | | 1 | 2 | 3 | 4 | 5 | 1 | 1 | 1 | 1 | 1 |
| Component (%) | Pigment dispersion | 40.0 | 40.0 | 40.0 | 40.0 | 40.0 | 40.0 | 40.0 | 40.0 | 40.0 | 40.0 |
| | Glycerin | 7.0 | 7.0 | 7.0 | 7.0 | 7.0 | 7.0 | 7.0 | 12.0 | 11.9 | 11.8 |
| | 1,2-Propanediol | 3.0 | 3.0 | 3.0 | 3.0 | 3.0 | | | | 0.1 | 0.2 |
| | 1,2-Butanediol | | | | | | 3.0 | | | | |
| | 1,2-Pentanediol | | | | | | | 3.0 | | | |
| | 2-Pyrrolidone | 5.0 | 5.0 | 5.0 | 5.0 | 5.0 | 5.0 | 5.0 | 5.0 | 5.0 | 5.0 |
| | Triethylene glycol | 5.0 | 5.0 | 5.0 | 5.0 | 5.0 | 5.0 | 5.0 | 5.0 | 5.0 | 5.0 |
| | NIKKOL BC-20 | 0.5 | 0.5 | 0.5 | 0.5 | 0.5 | 0.5 | 0.5 | 0.5 | 0.5 | 0.5 |
| | NIKKOL BO-50 | | | | | | | | | | |
| | NIKKOL BL-9EX | | | | | | | | | | |
| | Acetylenol E100 | 1.0 | 1.0 | 1.0 | 1.0 | 1.0 | 1.0 | 1.0 | 1.0 | 1.0 | 1.0 |
| | BYK-348 | | | | | | | | | | |
| | Proxel GXL (S) | 0.2 | 0.2 | 0.2 | 0.2 | 0.2 | 0.2 | 0.2 | 0.2 | 0.2 | 0.2 |
| | Proxel XL2 | | | | | | | | | | |
| | Pure water | 38.3 | 38.3 | 38.3 | 38.3 | 38.3 | 38.3 | 38.3 | 36.3 | 36.3 | 36.3 |

TABLE 1-2

Composition of ink

| | | Example | | | | | | | | | |
|---|---|---|---|---|---|---|---|---|---|---|---|
| | | 11 | 12 | 13 | 14 | 15 | 16 | 17 | 18 | 19 | 20 |
| Kinds of pigment particles | | 1 | 1 | 1 | 1 | 1 | 1 | 1 | 1 | 1 | 5 |
| Component (%) | Pigment dispersion | 40.0 | 40.0 | 40.0 | 40.0 | 40.0 | 40.0 | 40.0 | 40.0 | 40.0 | 40.0 |
| | Glycerin | 5.0 | 5.0 | 7.0 | 7.0 | 7.0 | 7.0 | 7.0 | 7.0 | 7.0 | 7.0 |
| | 1,2-Propanediol | 10.0 | 11.0 | 3.0 | 3.0 | 3.0 | 3.0 | 3.0 | 3.0 | 3.0 | |
| | 1,2-Butanediol | | | | | | | | | | |
| | 1,2-Pentanediol | | | | | | | | | | |
| | 2-Pyrrolidone | 5.0 | 5.0 | 5.0 | 5.0 | 5.0 | 5.0 | 5.0 | 5.0 | 5.0 | 5.0 |
| | Triethylene glycol | 2.0 | 2.0 | 5.0 | 5.0 | 5.0 | 5.0 | 5.0 | 5.0 | 5.0 | 5.0 |
| | NIKKOL BC-20 | 0.5 | 0.5 | | | | 0.04 | 0.05 | 2.0 | 2.1 | |
| | NIKKOL BO-50 | | | 0.5 | | | | | | | |
| | NIKKOL BL-9EX | | | | 0.5 | | | | | | |
| | Acetylenol E100 | 1.0 | 1.0 | 1.0 | 1.0 | 1.0 | 1.0 | 1.0 | 1.0 | 1.0 | 1.0 |
| | BYK-348 | | | | | | | | | | |
| | Proxel GXL (S) | 0.2 | 0.2 | 0.2 | 0.2 | 0.2 | 0.2 | 0.2 | 0.2 | 0.2 | 0.2 |
| | Proxel XL2 | | | | | | | | | | |
| | Pure water | 36.3 | 35.3 | 38.3 | 38.3 | 38.8 | 38.76 | 38.75 | 36.8 | 36.7 | 41.8 |

TABLE 1-3

| | | Comparative Example | | | | |
|---|---|---|---|---|---|---|
| | | 1 | 2 | 3 | 4 | 5 |
| Kinds of pigment particles | | 6 | 7 | 8 | 9 | 10 |
| Component (%) | Pigment dispersion | 40.0 | 40.0 | 40.0 | 40.0 | 40.0 |
| | Glycerin | 7.0 | 7.0 | 7.0 | 12.0 | 7.0 |
| | 1,2-Propanediol | 3.0 | 3.0 | 3.0 | 6.0 | 3.0 |
| | 1,2-Butanediol | | | | | |
| | 1,2-Pentanediol | | | | | |
| | 2-Pyrrolidone | 5.0 | 5.0 | 5.0 | 2.0 | 5.0 |
| | Triethylene glycol | 5.0 | 5.0 | 5.0 | | 5.0 |
| | NIKKOL BC-20 | 0.5 | 0.5 | 0.5 | | 0.5 |
| | NIKKOL BO-50 | | | | | |
| | NIKKOL BL-9EX | | | | | |
| | Acetylenol E100 | 1.0 | 1.0 | 1.0 | | 1.0 |
| | BYK-348 | | | | 0.4 | |
| | Proxel GXL (S) | 0.2 | 0.2 | 0.2 | | 0.2 |
| | Proxel XL2 | | | | 0.3 | |
| | Pure water | 38.3 | 38.3 | 38.3 | 39.3 | 38.3 |

Evaluations

An ink cartridge filled with each ink obtained in the foregoing was set in an ink jet recording apparatus mounted with a recording head for ejecting an ink by means of thermal energy (trade name: "PIXUS Pro9500 Mark II," manufactured by Canon Inc.). In the ink jet recording apparatus, an image recorded under such a condition that 8 ink droplets each having a mass of 3.5 ng are applied to a unit region measuring 1/600 inch×1/600 inch at a resolution of 600 dpi×600 dpi is defined as having "a recording duty of 100%." A pattern including two kinds of solid images having recording duties of 50% and 100% was recorded on each of glossy paper and art paper. It should be noted that a product with a trade name "Canon Photo Paper-Gloss Pro (platinum grade) PT101" (manufactured by Canon Inc.) was used as the glossy paper. In addition, a product with a trade name "Fine Art Paper Photo Rag" (manufactured by Canon Inc.) was used as the art paper. The resultant recorded products were air-dried for 24 hours and then evaluated for the following respective items. It should be noted that a spectrophotometer based on a CIE $L^*a^*b^*$ colorimetric system (trade name: "Spectrolino," manufactured by Gretag Macbeth Co.) was used in the colorimetry of an image. In the present invention, evaluation criteria "C," "B," and "A" in each of the following evaluation items corresponded to an unacceptable level, an acceptable level, and an excellent level, respectively. Table 2 shows the results of the evaluations.

Color Developability in Glossy Paper

The solid image having a recording duty of 100% in the recorded product obtained by using the glossy paper was evaluated for its color developability in the glossy paper by measuring values for its hue angle (h) and chroma ($c^*$) under the condition of a light source of D50. Evaluation criteria are as described below.

A: The hue angle was 75° or more and 90° or less, and the chroma was 95 or more.
B: The hue angle was 75° or more and 90° or less, and the chroma was less than 95.
C: The hue angle was less than 75° or more than 90°.

Color Developability in Art Paper

The solid image having a recording duty of 100% in the recorded product obtained by using the art paper was evaluated for its color developability in the art paper by measuring a value for its chroma ($c^*$) under the condition of a light source of D50. Evaluation criteria are as described below.

A: The chroma was 85 or more.
B: The chroma was 82 or more and less than 85.
C: The chroma was less than 82.

Lightfastness

The recorded product obtained by using the glossy paper was loaded into a xenon weatherometer (trade name: "Ci4000," manufactured by Atlas Co.) and then irradiated with xenon light for 200 hours under the conditions of a radiation intensity of 0.39 W/m², a black panel temperature of 63° C., and a relative humidity of 70%. Values for the optical densities of the solid image having a recording duty of 50% in the recorded product before and after the irradiation were measured, and then the image was evaluated for its lightfastness based on a value calculated from an equation "residual ratio of optical density (%)=(optical density after irradiation/optical density before irradiation)×100." Evaluation criteria are as described below.

A: The residual ratio of optical density was 80% or more.
B: The residual ratio of optical density was 70% or more and less than 80%.
C: The residual ratio of optical density was less than 70%.

TABLE 2

Results of evaluations

| | | Color developability in glossy paper | Color developability in art paper | Lightfastness |
|---|---|---|---|---|
| Example | 1 | A | A | A |
| | 2 | A | A | A |
| | 3 | A | A | A |
| | 4 | A | A | B |
| | 5 | A | A | B |
| | 6 | A | A | A |
| | 7 | A | A | A |
| | 8 | A | B | A |
| | 9 | A | B | A |
| | 10 | A | A | A |
| | 11 | A | A | A |
| | 12 | B | B | A |
| | 13 | A | A | A |
| | 14 | A | A | A |
| | 15 | B | A | A |
| | 16 | B | A | A |
| | 17 | A | A | A |
| | 18 | A | A | A |
| | 19 | A | B | A |
| | 20 | B | B | B |
| Comparative Example | 1 | C | A | B |
| | 2 | C | A | A |
| | 3 | C | A | A |
| | 4 | C | A | A |
| | 5 | B | C | C |

It should be noted that the color developability in the art paper of Example 8 was somewhat inferior to the color developability in the art paper of Example 9. In addition, the color developability in the glossy paper of Example 15 was somewhat inferior to the color developability in the glossy paper of Example 16.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-195799, filed Sep. 8, 2011, which is hereby incorporated by reference herein in its entirety.

What is claimed is:

1. An ink comprising a pigment with pigment particles having a structure represented by the following formula (1):

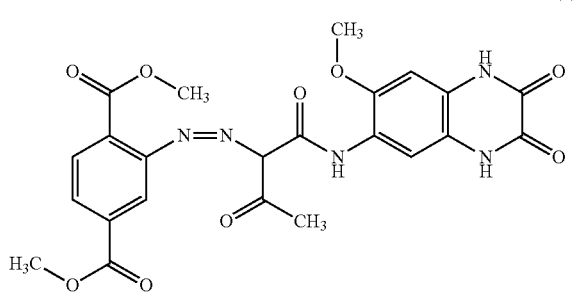

(1)

wherein a maximum absorption wavelength of the pigment particles of an absorption spectrum in a wavelength region of 200 nm or more and 800 nm or less is present in a range of 340 nm or more and 360 nm or less; and wherein the pigment particles have an average diameter on a volume basis of 50 nm or less.

2. An ink according to claim 1, wherein the pigment particles are obtained by:

supplying a liquid having dissolved therein a pigment serving as a raw material to a flow path, which is formed by placing two surfaces for treatment that rotate relatively to each other at an interval of 1 mm or less so that the surfaces are opposite to each other; and precipitating the pigment particles as fine particles in the flow path.

3. An ink according to claim 1, further comprising a 1,2-alkanediol.

4. An ink according to claim 3, wherein a content (% by mass) of the 1,2-alkanediol in the ink is 0.2% by mass or more and 10.0% by mass or less based on a total mass of the ink.

5. An ink according to claim 1, further comprising a polyoxyethylene alkyl ether as a surfactant.

6. An ink according to claim 5, wherein a content (% by mass) of the polyoxyethylene alkyl ether in the ink is 0.05% by mass or more and 2.0% by mass or less based on a total mass of the ink.

7. An ink according to claim 1, wherein the ink is utilized in ink jet recording.

8. An ink cartridge comprising an ink and an ink storage portion for storing the ink, wherein the ink comprises the ink according to claim 1.

9. An ink jet recording method comprising ejecting an ink from an ink jet recording head to record an image on a recording medium, wherein the ink comprises the ink according to claim 1.

10. An ink according to claim 1, wherein the pigment particles have an average diameter on a volume basis of 10 nm or more.

11. An ink according to claim 3, wherein the 1,2-alkanediol is at least one selected from the group consisting of 1,2-propanediol, 1,2-butanediol, and 1,2-pentanediol.

* * * * *